United States Patent
Talanki et al.

(10) Patent No.: US 12,293,081 B2
(45) Date of Patent: May 6, 2025

(54) METHOD AND SYSTEM FOR GENERATING MEMORY MAPS

(71) Applicant: Samsung Electronics Co., Ltd., Suwon-si (KR)

(72) Inventors: Raghu Vamsi Krishna Talanki, Bengaluru (IN); Archita Khare, Bengaluru (IN); Eldho P. Mathew, Bengaluru (IN); Jin In So, Bengaluru (IN); Jong-Geon Lee, Suwon-si (KR); Venkata Ravi Shankar Jonnalagadda, Suwon-si (KR); Vishnu Charan Thummala, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 35 days.

(21) Appl. No.: 18/310,741

(22) Filed: May 2, 2023

(65) Prior Publication Data
US 2024/0295963 A1    Sep. 5, 2024

(30) Foreign Application Priority Data

Mar. 2, 2023    (IN) .............................. 202341014161

(51) Int. Cl.
*G06F 3/06* (2006.01)
(52) U.S. Cl.
CPC ............ *G06F 3/061* (2013.01); *G06F 3/0659* (2013.01); *G06F 3/0673* (2013.01)
(58) Field of Classification Search
CPC ....... G06F 3/061; G06F 3/0659; G06F 3/0673
See application file for complete search history.

(56) References Cited

U.S. PATENT DOCUMENTS

| 6,236,602 | B1 | 5/2001 | Patti |
| 8,799,553 | B2 | 8/2014 | Hendry et al. |
| 10,468,118 | B2 | 11/2019 | Walton et al. |
| 10,649,927 | B2 | 5/2020 | Raghava et al. |
| 10,776,227 | B2 | 9/2020 | Kim et al. |
| 2018/0284994 | A1* | 10/2018 | Haller ................. G06F 12/0292 |
| 2023/0236735 | A1* | 7/2023 | Ayyapureddi .... G11C 11/40611 714/47.2 |
| 2024/0028685 | A1* | 1/2024 | Taveira .................... G06F 21/33 |
| 2024/0069804 | A1* | 2/2024 | Brewer ................. G06F 3/0659 |

* cited by examiner

*Primary Examiner* — Masud K Khan
(74) *Attorney, Agent, or Firm* — Harness, Dickey & Pierce, P.L.C.

(57) ABSTRACT

The present disclosure relates to field of Dual In-Line Memory Modules that discloses method and system for generating memory maps. The method comprises detecting, by computing system, at least one of DIMM and one or more Dynamic Random Access Memory (DRAM) chips associated with computing system. The one or more accelerators are configured in at least one of DIMM and one or more DRAM chips. Further, the method includes determining accelerator information for each of one or more accelerators via at least one of Serial Presence Detect (SPD) and Multi-Purpose Register (MPR) associated with at least one of DIMM and one or more DRAM chips. Method includes generating unique memory map for each of one or more accelerators based on accelerator information of corresponding one or more accelerators. As a result, performance of computing system may be improved as accelerator capabilities of one or more accelerators are effectively utilized.

12 Claims, 7 Drawing Sheets

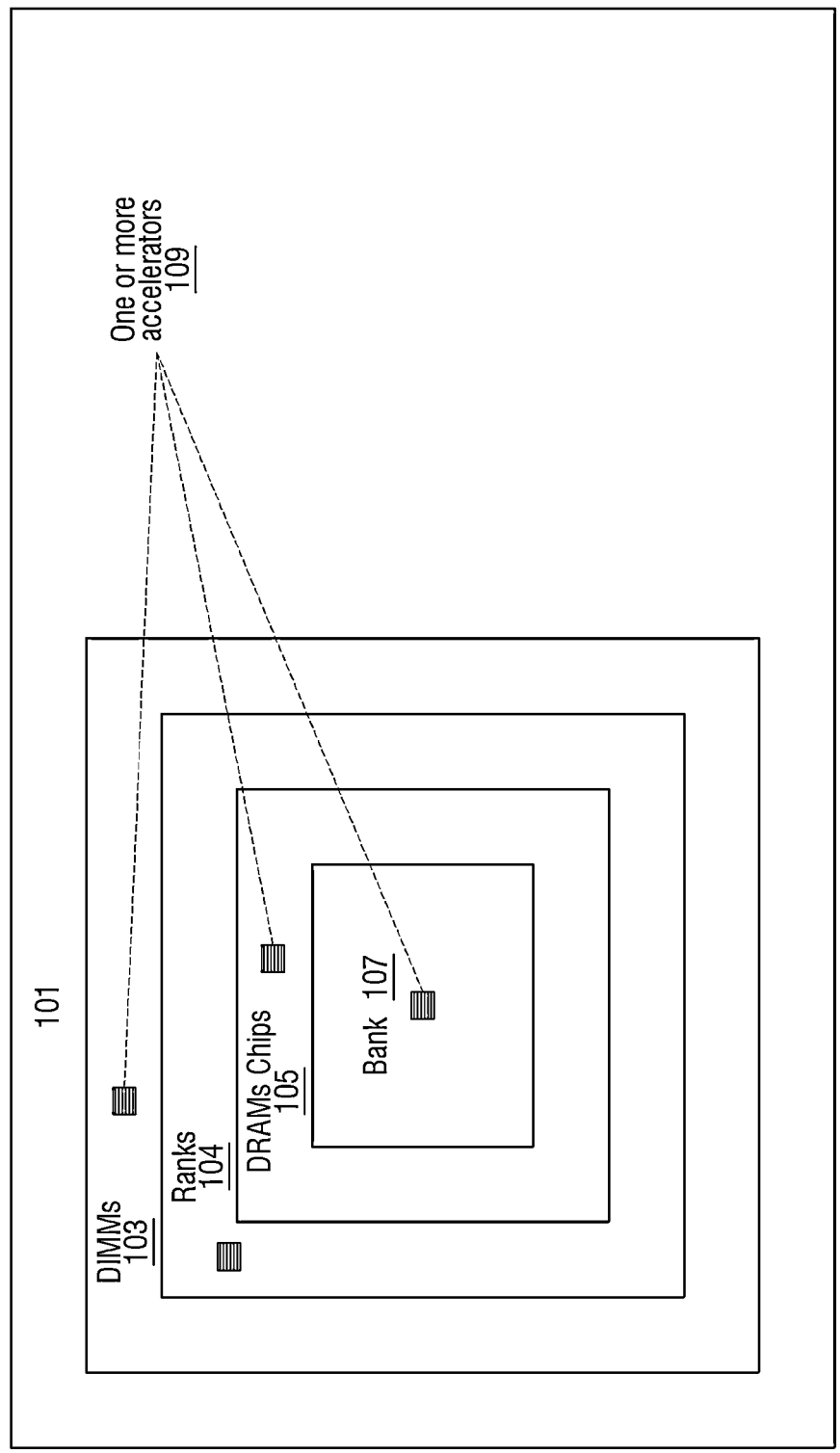

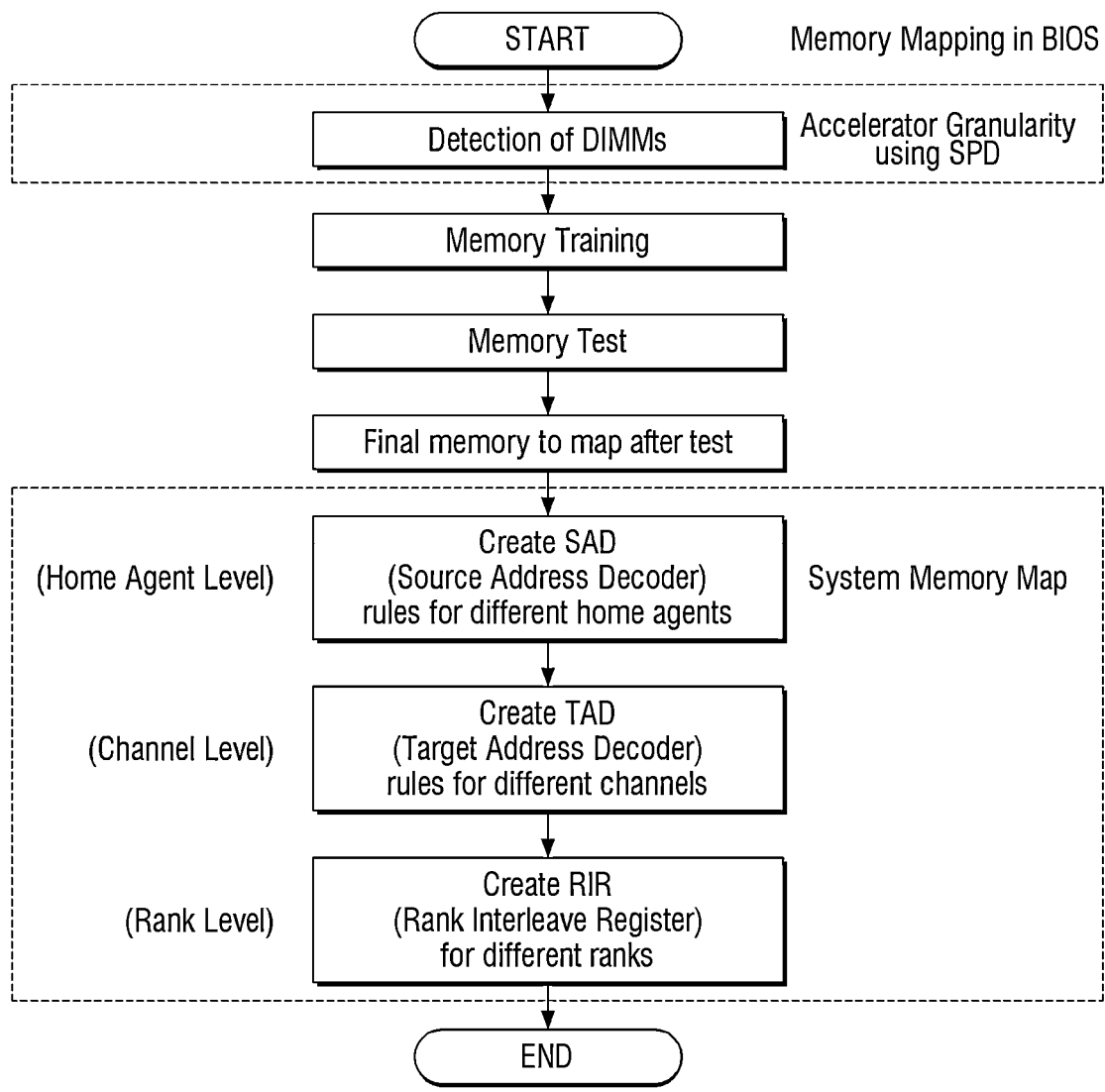

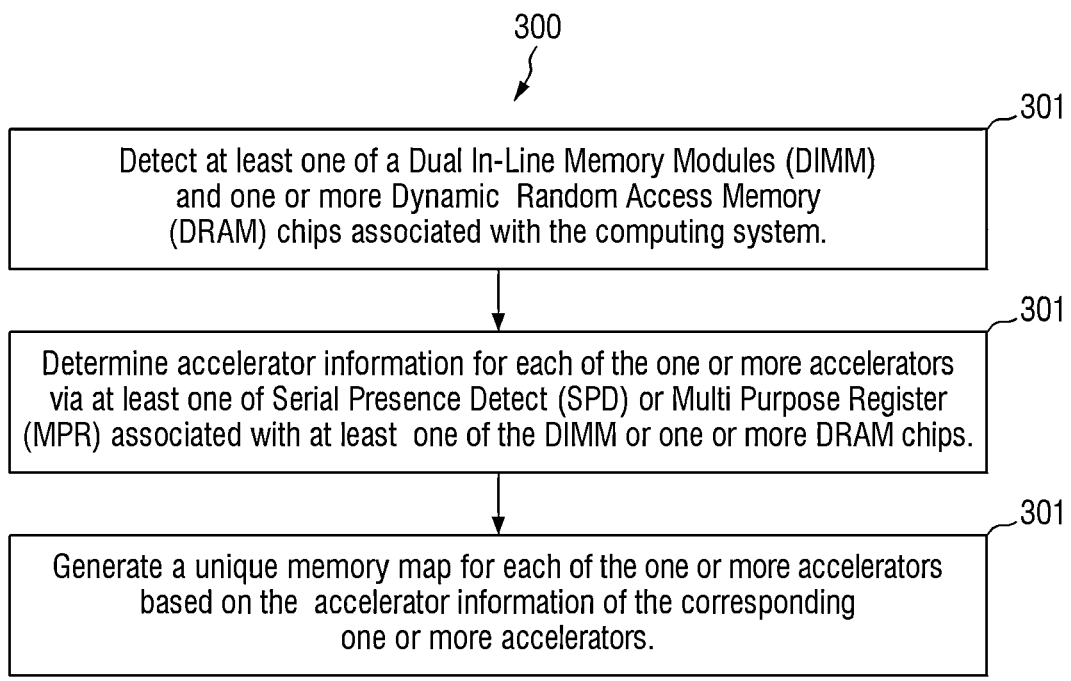

METHOD AND SYSTEM FOR GENERATING MEMORY MAPS

CROSS-REFERENCE TO RELATED APPLICATIONS

A claim of priority under 35 U.S.C. § 119 is made to Indian patent application Ser. No. 202341014161, filed on Mar. 2, 2023 in the Indian Intellectual Property Office, the entirety of which is hereby incorporated by reference.

TECHNICAL FIELD

Example embodiments of the present disclosure generally relate to the field of Dual In-Line Memory Modules (DIMM) and more particularly, but not exclusively, example embodiments of the present disclosure relate to a DIMM and a method of generating memory maps.

BACKGROUND OF THE DISCLOSURE

Generally, DIMM is a module that contains one or several Random-Access Memory (RAM) chips on a small circuit board with pins that connect to a computer motherboard. The DIMM stores each data bit in a separate memory cell. Currently, firmware or BIOS configured in the system does not identify accelerator capabilities present in Dual In-Line Memory Modules (DIMM) or Dynamic Random Access Memory (DRAM) while preparing memory maps. Due to this, the system performance is reduced as the accelerator capabilities are not used optimally.

SUMMARY OF THE DISCLOSURE

One or more shortcomings of the conventional systems are overcome by system and method as claimed and additional advantages are provided through the provision of system and method as claimed in the present disclosure. Additional features and advantages are disclosed through example embodiments. Other example embodiments of the disclosure are described in detail herein and are considered a part of the claimed disclosure.

An example embodiment of the present disclosure discloses a method of generating memory maps. The method comprises detecting at least one of a Dual In-Line Memory Modules (DIMM) and one or more Dynamic Random Access Memory (DRAM) chips associated with the computing system. The one or more accelerators are configured in at least one of the DIMMS and the one or more DRAM chips. Further, the method includes determining accelerator information for each of one or more accelerators via at least one of Serial Presence Detect (SPD) and Multi-Purpose Register (MPR) associated with at least one of the DIMM and one or more DRAM chips. Finally, the method discloses generating a unique memory map for each of the one or more accelerators based on the accelerator information of the corresponding one or more accelerators.

Another example embodiment of the present disclosure discloses a computing system for generating memory maps. The memory stores the processor-executable instructions, which, on execution, causes the processor to detect at least one of a Dual In-Line Memory Modules (DIMM) and one or more Dynamic Random Access Memory (DRAM) chips associated with the computing system. The one or more accelerators are configured in at least one of the DIMMS and the one or more DRAM chips. Further, the processor determines accelerator information for each of one or more accelerators via at least one of Serial Presence Detect (SPD) and Multi-Purpose Register (MPR) associated with at least one of the DIMMs and one or more DRAM chips. Finally, the processor generates a unique memory map for each of the one or more accelerators based on the accelerator information of the corresponding one or more accelerators.

It is to be understood that example embodiments of the disclosure described herein may be used in any combination with each other. Several embodiments and/or features may be combined together to form further example embodiments of the disclosure.

The foregoing summary is illustrative only and is not intended to be in any way limiting. In addition to the example embodiments described above, further example embodiments, and features will become apparent by reference to drawings and the following detailed description.

BRIEF DESCRIPTION OF THE ACCOMPANYING FIGURES

The accompanying drawings, which are incorporated in and constitute a part of this disclosure, illustrate example embodiments and, together with the description, serve to explain the disclosed principles, features, and elements. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1B shows hierarchy levels of a computing system where one or more accelerators can be configured, in accordance with some example embodiments of the present disclosure;

FIG. 2C shows a process flow for generating memory maps, in accordance with some example embodiments of the present disclosure;

FIG. 3 shows a flowchart illustrating a method performed by the computing system for generating memory maps, in accordance with some example embodiments of the present disclosure.

Figure 1A:
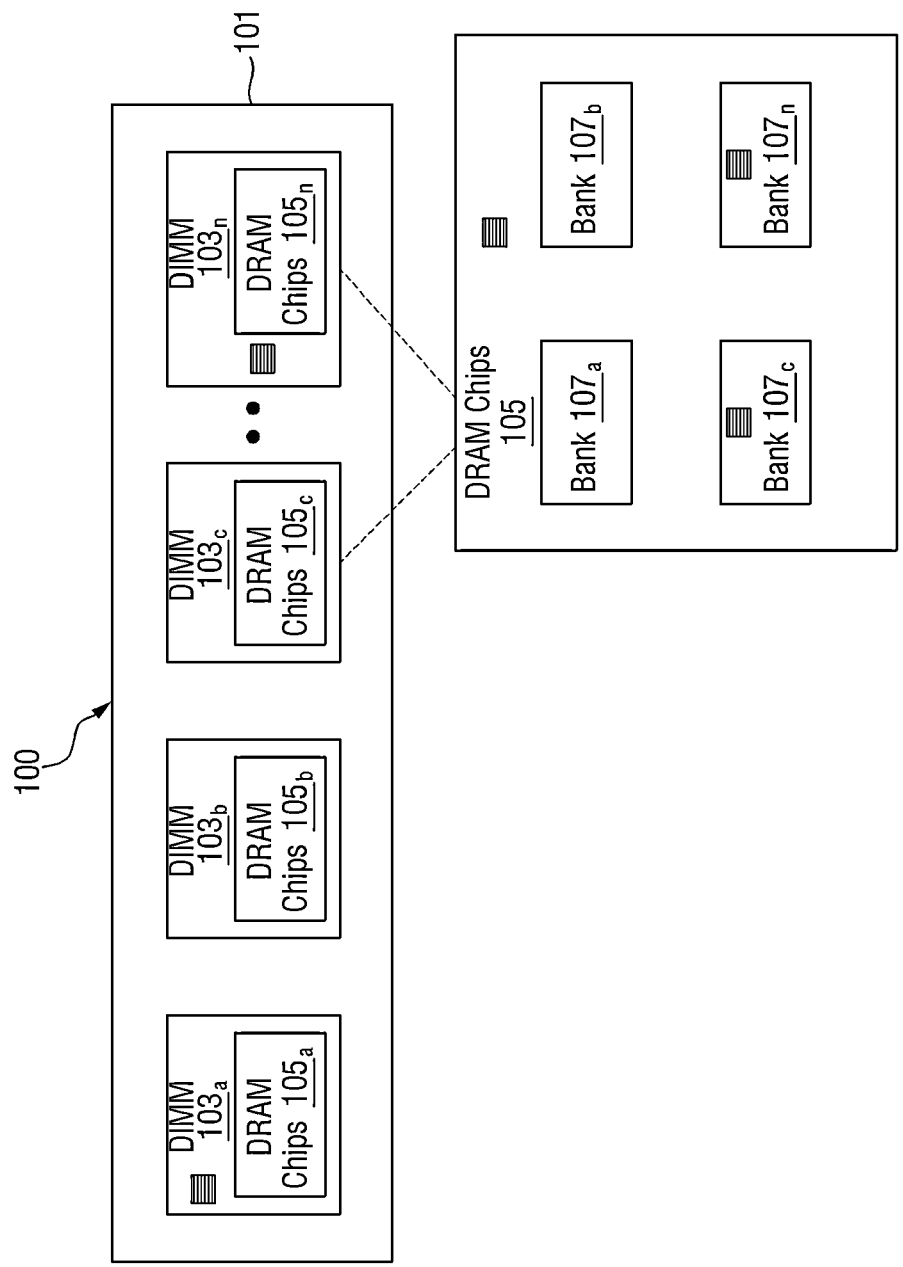
FIG. 1A shows an example architecture of the computing system for generating memory maps, in accordance with some example embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

The figures depict some example embodiments of the disclosure for purposes of illustration only. One skilled in the art will readily recognize from the following description that alternative embodiments of the system illustrated herein may be employed without departing from the principles of the disclosure described herein.

DETAILED DESCRIPTION

While the disclosure is susceptible to various modifications and alternative forms, specific embodiments thereof have been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a system for generating memory maps. Generally, a memory map is a massive table, in effect a database, which comprises complete information about how the memory is structured in a computing system. The memory map works, for instance, in the form of a gigantic office organizer. Particularly, a computing system performance can be improved when the memory maps are prepared based on one more accelerator capabilities present in at least one of Dual In-Line Memory Modules (DIMM) or Dynamic Random Access Memory (DRAM) chips. Initially, the one or more DIMMs or the DRAM chips associated with the computing system may be detected. Further, one or more accelerators that are configured in at least one of the DIMMs and one or more DRAM chips may be detected. The one or more accelerators may be classified into one or more hierarchy levels such as rank level, DRAM chip level, bank level, bank groups level, rows and columns level. In some example embodiments, a BIOS configured in the computing system may determine accelerator information for each of the one or more accelerators via at least one of Serial Presence Detect (SPD) and Multi-Purpose Register (MPR) associated with at least one of the DIMMs and one or more DRAM chips. The accelerator information may be the indication of presence or absence of the one or more accelerators in at least one of the DIMMs and the one or more DRAM chips, capabilities of the corresponding one or more accelerators and position of the one or more accelerators in at least one of the DIMMs and the one or more DRAM chips. The accelerator information of each of the one or more accelerators is prestored in one or more reserved bytes of at least one of the SPD and the MPR.

In some example embodiments, upon determining the accelerator information for each of the one or more accelerators, a unique memory map for each of the one or more accelerators may be generated based on the accelerator information of the corresponding one or more accelerators. The one or more accelerators may be grouped based on position of the one or more accelerators in at least one of the DIMMs and the one or more DRAM chips.

The present disclosure discloses generation of memory maps based on awareness of capabilities of one or more accelerators associated with the DIMMs or DRAMs. As a result, the performance of the computing system may be improved as the accelerator capabilities of the one or more accelerators are effectively utilized. Further, separate memory maps for each of one or more accelerators may be generated. As separate memory maps are generated, accelerator granularity can be handled, and complete system interleaving need not be disabled which helps in improving system performance. This leads to efficient utilization of accelerators. Further, one or more tasks may be assigned to one or more accelerators based on the accelerator capabilities due to which the tasks can be effectively divided among one or more accelerators. In other words, the one or more tasks are divided among the one or more accelerators based on the accelerator capabilities in a way that no accelerator is overutilized or underutilized. As a result, the load on each of the one or more accelerators is reduced as the tasks are distributed among the one or more accelerators.

A description of some example embodiments with several components in communication with each other does not imply that all such components are required. On the contrary, a variety of optional components are described to illustrate the wide variety of possible example embodiments of the disclosure.

In the following detailed description of some example embodiments of the disclosure, reference is made to the accompanying drawings that form a part hereof, and in which are shown by way of illustration specific example embodiments in which the disclosure may be practiced. These example embodiments are described in sufficient detail to enable those skilled in the art to practice the disclosure, and it is to be understood that other example embodiments may be utilized and that changes may be made without departing from the scope of the present disclosure. The following description is, therefore, not to be taken in a limiting sense.

FIG. 1 shows an example architecture of the computing system for generating memory maps, in accordance with some example embodiments of the present disclosure.

The example architecture 100 discloses computing system 101 including Dual In-Line Memory Module (DIMM) 103$_a$ to DIMM 103$_n$ (hereinafter collectively referred as DIMMs 103), Dynamic Random Access Memory (DRAM) chips 105$_a$ to DRAM chips 105$_n$ (hereinafter collectively referred as DRAM Chips 105), a bank 107$_a$ to a bank 107$_n$ (hereinafter collectively referred as banks 107) and an accelerator 109$_a$ to accelerator 109$_n$ (hereinafter collectively referred as one or more accelerators 109). The present disclosure discloses a method of generating memory maps. Generally, the memory maps are a massive table, in effect a database, which comprises complete information about how the memory is structured in the computing system 101. The memory map works something like a gigantic office organizer. Dynamic Random-Access Memory chips may be also called a RAM stick, and comprise a series of dynamic random-access memory integrated circuits. These modules are mounted on a printed circuit board and designed for use in personal computers, workstations, printers, and servers. They are the predominant method for adding memory into a computing system 101. The DIMM 103 and the one or more DRAM chips 105, are the most common type of primary memory. DRAM chips 105 consist of a transistor and capacitor that create a memory cell, which represents a single bit. The DIMM 103 is installed on a motherboard and stores each data bit in separate memory cells. In some example embodiments, the DIMM 103 comprises one or more DRAM chips 105 which typically takes the form of an integrated circuit chip, which can consist of dozens to billions of DRAM memory cells.

In some example embodiments, the one or more accelerators 109 are configured in at least one of the DIMMs 103 and the one or more DRAM chips 105. The one or more accelerators 109 may be positioned at one or more hierarchy levels, for instance. at a rank level, DRAM chip level, bank level, bank groups level, rows and columns level. In some example embodiments, accelerator information related to the one or more accelerators 109 may be stored in a Serial Presence Detect (SPD) associated with at least one of the DIMMs 103 and one or more-DRAM chips 105. In some other example embodiments, the accelerator information related to one or more accelerators 109 may be stored in a Multi-Purpose Register (MPR) associated with at least one of the DIMMs 103 and one or more DRAM chips 105. The accelerator information may include, but not limited to, indication of presence or absence of the one or more accelerators 109 in at least one of the DIMM 103 and the one or more DRAM chips 105, capabilities of the corresponding one or more accelerators 109 and position of the one or more accelerators 109 in at least one of the DIMM 103 and the one or more DRAM chips 105. The one or more accelerators 109 may be assigned with one or more tasks which is based on the accelerator information for each of the one or more accelerators 109. The one or more accelerators 109 may be used for performing one or more tasks related to applications such as finding maximum value, average value for a given range in database, searching for a given key or set of keys, performing Sparse Length Sum (SLS) operation and the like. SLS operation is a kind of operation in recommendation model which performs floating point additions of data. In some example embodiments, performance of the computing system 101 may be improved when the memory maps are prepared based on the accelerator information of the corresponding one or more accelerators 109.

In some example embodiments, the present disclosure discloses a computing system 101 for generating memory maps. The computing system 101 comprises processor 201, memory 205 and an Input/Output (I/O) interface 203. The processor 201 may detect at least one of DIMMs 103 and one or more DRAM chips 105 associated with the computing system 101. In some example embodiments, the one or more accelerators 109 may be configured in at least one of the DIMMs 103 and the one or more DRAM chips 105 as shown in FIG. 1A. Upon detecting the DIMM and the one or more DRAM chips, the processor 201 may determine accelerator information for each of the one or more accelerators 109 via at least one of Serial Presence Detect (SPD) or Multi-Purpose Register (MPR) associated with at least one of the DIMMs 103 and one or more DRAM chips 105. In some example embodiments, the accelerator information of each of (or alternatively, at least one of) the one or more accelerators 109 may be prestored in one or more reserved bytes of at least one of the SPD or the MPR. The one or more reserved bytes are reserved in SPD or MPR which may indicate position of the one or more accelerators 109 by setting a flag in a predefined or desired manner in the corresponding one or more reserved bytes. In some example embodiments, based on such accelerator information of the corresponding one or more accelerators, the processor 201 may assign one or more tasks to the one or more accelerators.

In some example embodiments, upon determining accelerator information for each of the one or more accelerators 109 via at least one of SPD or MPR associated with at least one of the DIMMs 103 and one or more DRAM chips 105, the processor 201 may generate a unique memory map for each of the one or more accelerators 109 based on the accelerator information of the corresponding one or more accelerators 109. In some example embodiments, the one or more accelerators 109 may be present at different levels such as rank level, DRAM chip level, bank level, bank groups level, rows and columns level. When one or more accelerators 109 are present at same positional level, the processor 201 may group the one or more accelerators into one or more groups based on positional level of the one or more accelerators 109 in at least one of the DIMMs 103 and the one or more DRAM chips 105 and may generate a single memory map for each of the one or more groups of the one or more accelerator 109. Further, processor 201 may configure memory controller registers based on generated memory maps for each of the corresponding one or more accelerators 109.

Figure 2A:
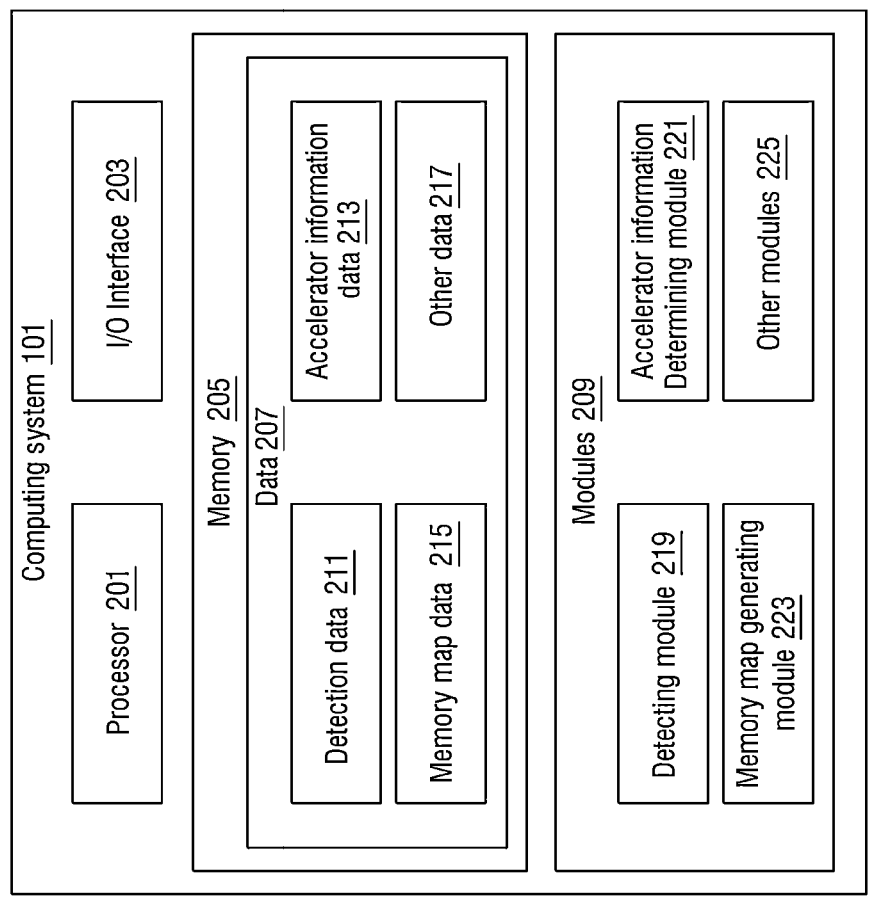
FIG. 2A shows a detailed block diagram of the computing system for generating memory maps, in accordance with some example embodiments of the present disclosure.

FIG. 2A shows a detailed block diagram of the computing system 101 for generating memory maps, in accordance with some example embodiments of the present disclosure.

In some implementations, computing system 101 may include data 207 and modules 209. As an example, data 207 is stored in memory 205 of the computing system 101 as shown in the FIG. 2A. In one example embodiment, data 207 may include detection data 211, accelerator information data 213, memory map data 215 and other data 217. In the illustrated FIG. 2A, modules 209 are described herein in detail.

In an implementation, the computing system 101 may include an I/O interface 203, a processor 201, and a memory 205. The I/O interface 203 may be configured to communicate internally between processor 201, accelerators, registers and the like, and also with one or more external sources and/or external equipment associated with the computing system 101. In some example embodiment, the memory 205 may be communicatively coupled to the processor 201. The processor 201 may be configured to perform one or more functions of the computing system 101.

In some example embodiments, the data 207 may be stored in the memory 205 in form of various data structures. Additionally, the data 207 can be organized using data models, such as relational or hierarchical data models. The other data 217 may store data, including temporary data and temporary files, generated by the modules 209 for performing the various functions of the computing system 101.

In some example embodiments, the detection data 211 may correspond to the data or the information that may be relating to at least one of a Dual In-Line Memory Modules (DIMM) 103 and one or more Dynamic Random Access Memory (DRAM) chips 105 associated with an operating system of the computing system 101. In other words, the detection data 211 may reflect the number of DIMMs 103 and DRAMs chips 105 that may be associated with the computing system 101. Upon detecting the presence of at least one of DIMMs 103 and one or more DRAM chips 105 associated with the computing system 101, the one or more accelerators 109 that may be configured with DIMMs 103 and DRAM chips 105 may be detected.

Figure 2B:
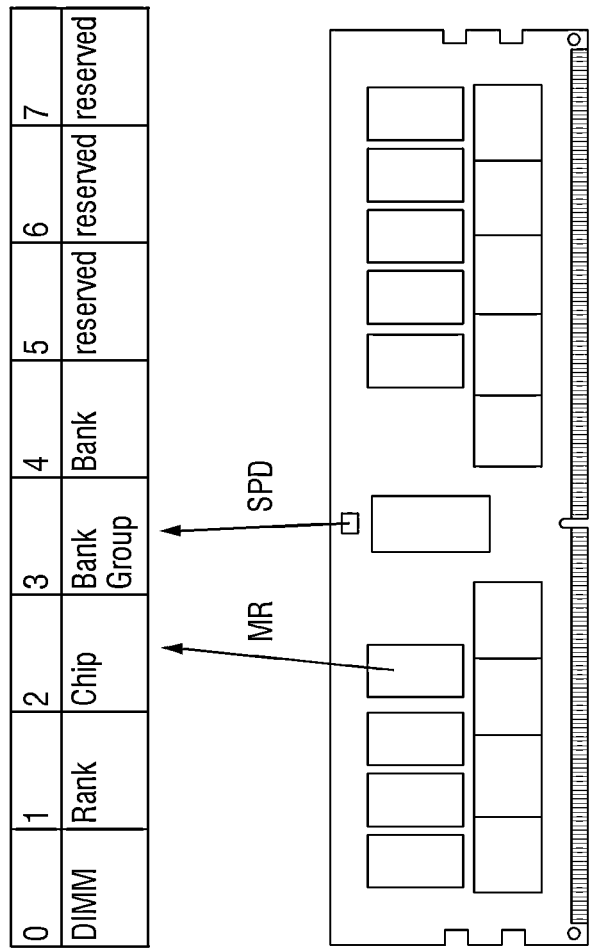
FIG. 2B shows a bit layout of reserved byte in Serial Presence Detect (SPD) or Multi-Purpose Register (MPR), in accordance with some example embodiments of the present disclosure.

In some example embodiments, the accelerator information data 213 corresponds to data or the information that may be stored in one or more accelerators 109. The accelerator information of one or more accelerators 109 is determined via at least one of Serial Presence Detect (SPD) or Multi-Purpose Register (MPR) associated with at least one of the DIMM 103 and one or more DRAM chips 105. In other words, the accelerator information of each of the one or more accelerators 109 is prestored in one or more reserved bytes of at least one of the SPD and the MPR. The accelerator information data 213 may include, but not limited to, indication of presence or absence of the one or more accelerators 109 in at least one of the DIMMs 103 and the one or more DRAM chips 105, capabilities of the corresponding one or more accelerators 109 and position of the one or more accelerators 109 in at least one of the DIMMs 103 and the one or more DRAM chips 105. In some example embodiments, position of the one or more accelerators 109 may be indicated by setting a flag in a predefined or desired manner in corresponding one or more reserved bytes as shown in FIG. 2B.

In some example embodiments, the memory map data 215 may include generated memory maps and data related to the generated memory maps for each of the one or more accelerators 109.

In some example embodiments, the data 207 may be processed by one or more modules 209 of the computing system 101. As used herein, the term module refers to an Application Specific Integrated Circuit (ASIC), an electronic circuit, a processor 201 (shared, dedicated, or group) and memory 205 that execute one or more software or firmware programs, a combinational logic circuit, and/or other suitable components that provide the described functionality. In some example embodiment, the other modules 225 may be used to perform various miscellaneous functionalities of the computing system 101. It will be appreciated that such modules 209 may be represented as a single module or a combination of different modules.

In some example embodiments, the modules 209 may include, for example, a detecting module 219, accelerator information determining module 221, memory map generating module 223 and other modules 225. The other modules 225 may be used to perform various miscellaneous functionalities of the computing system 101. It will be appreciated that such aforementioned modules 209 may be represented as a single module or a combination of different modules.

In some example embodiments, the detecting module 219 may detect at least one of a DIMM 103 and one or more-DRAM chips 105 associated with the computing system 101. For instance, consider there are 4 DIMMs and 4 DRAMs associated with the computing system 101. The detecting module 219 may detect all the 4 DIMMs 103 and 4-DRAM chips 105 associated with the computing system 101.

In some example embodiments, upon detecting the DIMM 103 and the one or more DRAM chips 105, the accelerator information determining module 221 may determine accelerator information of one or more accelerators 109 via at least one of Serial Presence Detect (SPD) and Multi-Purpose Register (MPR) associated with at least one of the DIMMs 103 and the one or more DRAM chips 105. In some example embodiments, the one or more accelerators 109 may be present at one or more hierarchy levels within the computing system 101 such as rank level, DRAM chip level, bank level, bank groups level, rows and columns level. In some example embodiments, the accelerator information of each of (or alternatively, at least one of) the one or more accelerators 109 may be prestored in one or more reserved bytes of at least one of the SPD or the MPR. The one or more reserved bytes may indicate position of the one or more accelerators 109 by setting a flag in a predefined or desired manner in the corresponding one or more reserved bytes. For instance, when the reserved byte is set to 0, then it is the indication that accelerator may be present at DIMM level 103. Further, when the reserved byte is set to 1, then it is an indication that accelerator may be present at rank level. However, this example should not be construed as a limitation of the present disclosure. Any other predefined or desired manner of setting the flags with the one or more reserved bytes of the SPD or MPR may be used in the context of the present disclosure and are considered to be within the scope of the present disclosure.

Further, in some example embodiments, the memory map generating module 223 may generate a unique memory map for each of the one or more accelerators 109 based on the accelerator information of the corresponding one or more accelerators 109. The unique memory map may be generated using one or more predefined or desired memory map generating techniques. Further, in some other example embodiments, memory map generating module 223 may group the one or more accelerators 109 into one or more groups based on position of the one or more accelerators 109 in at least one of the DIMMs 103 and the one or more DRAM chips 105. Based on the generated one or more groups, the memory map generating module 223 may generate a memory map for each of the one or more groups of the one or more accelerators 109. For instance, there may be 4 DIMMs associated with the computing system 101. The one or more accelerators 109 can be at any of the hierarchy levels such as rank level, DRAM chip level, bank level, bank groups level, rows and columns level. For example, if the one or more accelerators 109 are present at bank level in all the 4 DIMMs, then the memory map generating module 223 may consider all accelerators 109 present at the bank level as a single group and generates a memory map representing all the accelerators of the group.

As mentioned above, the memory maps may be generated based on one or more predefined or desired memory map generating techniques. In some example embodiments, FIG. 2C shows an example memory mapping flow performed in BIOS.

As shown in the FIG. 2C, initially, DIMM detection is performed which may require or rely on information related to the DIMMs to be communicated with the BIOS associated with the operating system of the computing system 101 which may be used to configure a module memory controller. In some example embodiments, the process further involves performing memory training that sets up communication between processor 201 and memory devices without losing signal integrity.

In some example embodiments, once memory training is completed, memory module may be tested with various set of memory test patterns to detect faults and take appropriate actions when it is required or desired. Further, when memory testing is completed, memory would be ready to be used for any operations.

In some example embodiments, a memory map comprises complete information about how the memory is structured in the computing system 101. Memory mapping is the process which creates the information at BIOS and passes it to the operating system of the computing system 101. In this process, memory controller registers like Source Address Decoder (SAD), Target Address Decoder (TAD) and Rank Interleave Registers (RIR) are configured to prepare memory maps. The above-mentioned step is in which one or more registers that are configured to prepare memory map for NMP DIMM by the BIOS which may use accelerator information read in DIMM detection and use it to configure registers in the desired manner. As a result, an efficient memory map of the computing system 101 may be provided which may be based on the accelerator information and also may improve the overall performance.

FIG. 3 shows a flowchart illustrating a method performed by the computing system 101 for generating memory maps, in accordance with some example embodiments of the present disclosure.

As illustrated in FIG. 3, the method 300 includes one or more blocks illustrating a method of generating the memory maps. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include detecting, by a processor 201 of the computing system 101, at least one of a Dual In-Line Memory Modules (DIMM) 103 and one or more Dynamic Random Access Memory (DRAM) chips associated with the computing system 101. In some example embodiments, one or more accelerators 109 may be configured in at least one of the DIMM 103 and the one or more DRAM chips 105.

At block 303, the method 300 may include determining, by the processor 201, accelerator information for each of the one or more accelerators 109 via at least one of Serial Presence Detect (SPD) or Multi-Purpose Register (MPR) associated with at least one of the DIMMs 103 and one or more DRAM chips 105.

At block 305, the method 300 may include generating, by the processor 201, a unique memory map for each of the one or more accelerators 109 based on the accelerator information of the corresponding one or more accelerators 109. In some example embodiments, the processor 201 may assign one or more tasks to the one or more accelerators based on the memory map and the accelerator information of the corresponding one or more accelerators. For example, a task may be assigned to an accelerator when the memory map indicates that accelerator has the desired capabilities for the task.

Figure 4:
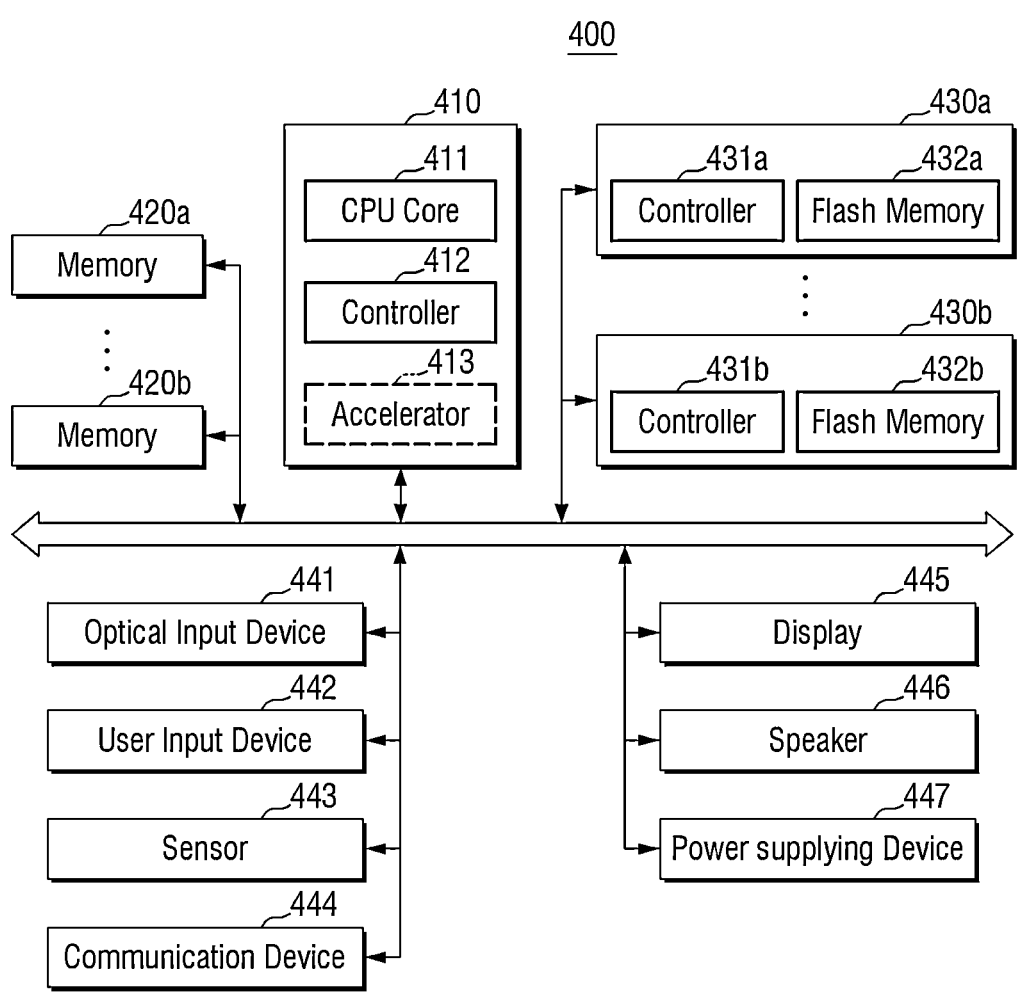
FIG. 4 illustrates a general computing system architecture, in accordance with some example embodiments of the present disclosure.

FIG. 4 is an example general diagram of a system 400 to which a storage device is applied, according to some example embodiments of the present disclosure. The system 400 of FIG. 4 may basically be a mobile system, such as a portable communication terminal (e.g., a mobile phone), a smartphone, a tablet personal computer (PC), a wearable device, a healthcare device, or an Internet of things (IOT) device. However, the system 400 of FIG. 4 is not necessarily limited to the mobile system and may be a PC, a laptop computer, a server, a media player, or an automotive device (e.g., a navigation device).

Referring to FIG. 4, system 400 may include a main processor 410, memories (e.g., 420a and 420b, and storage devices (e.g., 430a and 430b). In addition, the system 400 may include at least one of an image capturing device (or optical input device) 441, a user input device 442, a sensor 443, a communication device 444, a display 445, a speaker 446, a power supplying device 447, and a connecting interface 448.

The main processor 410 may control all operations of the system 400, more specifically, operations of other components included in the system 400. The main processor 410 may be implemented as a general-purpose processor, a dedicated processor, or an application processor.

The main processor 410 may include at least one CPU core 411 and further include a controller 412 configured to control the memories 420a to 420b and/or the storage devices 431a to 432b. In some example embodiments, the main processor 410 may further include an accelerator 453, which is a dedicated circuit for a high-speed data operation, such as an artificial intelligence (AI) data operation. The accelerator 453 may include a graphic's processing unit (GPU), a neural processing unit (NPU) and/or a data processing unit (DPU) and be implemented as a chip that is physically separate from the other components of the main processor 410.

The memories 420a to 420b may be used as main memory devices of the system 400. Although each of the memories 420a to 420b may include a volatile memory, such as static random access memory (SRAM) and/or dynamic RAM (DRAM), each of the memories 420a to 420b may also include non-volatile memory, such as a flash memory, phase-change RAM (PRAM) and/or resistive RAM (RRAM). Memories 420a to 420b may be implemented in the same package as the main processor 410.

The storage devices 430a and 430b may serve as non-volatile storage devices configured to store data regardless of whether power is supplied thereto and have larger storage capacity than the memories 420a to 420b. The storage devices 430a and 430b may respectively include storage controllers (STRG CTRL) and NVM (Non-Volatile Memory) 432a and 432b configured to store data via the control of the storage controllers 431a and 431b. Although the NVMs 432a and 432b may include flash memories having a two-dimensional (2D) structure or a three-dimensional (3D) V-NAND structure, the NVMs may include other types of NVMs, such as PRAM and/or RRAM.

The storage devices 430a and 430b may be physically separated from the main processor 410 and included in the system 400 or implemented in the same package as the main processor 410. In addition, the storage devices 430a and 430b may have types of solid-state devices (SSDs) or memory cards and be removably combined with other components of the system 100 through an interface, such as the connecting interface 448 that will be described below. The storage devices 430a and 430b may be devices to which a standard protocol, such as a universal flash storage (UFS), an embedded multi-media card (eMMC), or a non-volatile memory express (Nomee), is applied, without being limited thereto.

The optical input device 441 may capture still images or moving images. The optical input device 441 may include a camera, a camcorder, and/or a webcam.

The user input device 442 may receive various types of data input by a user of the system 400 and include a touch pad, a keypad, a keyboard, a mouse, and/or a microphone.

The sensor 443 may detect various types of physical quantities, which may be obtained from the outside of the system 400 and convert the detected physical quantities into electric signals. The sensor 443 may include a temperature sensor, a pressure sensor, an illuminance sensor, a position sensor, an acceleration sensor, a biosensor, and/or a gyroscope sensor.

The communication device 444 may transmit and receive signals between other devices outside the system 400 according to various communication protocols. The communication device 444 may include an antenna, a transceiver, and/or a modem.

The display 445 and the communication device (e.g., speaker) 444 may serve as output devices configured to respectively output visual information and auditory information to the user of the system 400.

The power supplying device 447 may appropriately convert power supplied from a battery (not shown) embedded in the system 400 and/or an external power source, and supply the converted power to each of components of the system 400.

Any of the elements and/or functional blocks disclosed above may include or be implemented in processing circuitry such as hardware including logic circuits; a hardware/software combination such as a processor executing software; or a combination thereof. For example, the accelerators 109, modules 209 (including detecting module 219, memory map generating module 223, accelerator information determining module 221, and other modules 225), controller 412, accelerator 413, and controllers 431*a*, 431*b*, etc. may be implemented as processing circuitry. The processing circuitry specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Processor(s), controller(s), and/or processing circuitry may be configured to perform actions or steps by being specifically programmed to perform those action or steps (such as with an FPGA or ASIC) or may be configured to perform actions or steps by executing instructions received from a memory, or a combination thereof.

The above detailed example embodiments disclose generation of memory maps based on awareness of capabilities of one or more accelerators associated with the DIMMs or DRAMs. As a result, the performance of the computing system may be improved as the accelerator capabilities of one or more accelerators are effectively utilized. Further, separate memory maps for each of one or more accelerators may be generated. Further, one or more tasks may be assigned to one or more accelerators based on the accelerator capabilities due to which the tasks can be effectively divided among one or more accelerators. In other words, the one or more tasks are divided among one or more accelerators based on the accelerator capabilities in a way that no accelerator is overutilized or underutilized. As a result, load on each of the one or more accelerators is reduced as the tasks are distributed among all the one or more accelerators.

A description of some example embodiments with several components in communication with each other does not imply that all such components are required. On the contrary a variety of optional components are described to illustrate the wide variety of possible example embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other example embodiments of the invention need not include the device itself.

The specification has described a method and computing system 101 for generating memory maps. The illustrated steps are set out to explain the example embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed example embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the example embodiments of the present invention are intended to be illustrative, but not limiting, of the scope of the invention, which is set forth in the following claims.

| Referral Numerals: | |
| --- | --- |
| Reference Number | Description |
| 100 | General Architecture |
| 101 | Computing system |
| 103 | DIMM |
| 104 | Rank |
| 105 | DRAM chips |
| 107 | Banks |
| 109 | One or more accelerators |
| 205 | Memory |
| 207 | Data |
| 209 | Modules |
| 211 | Detection data |
| 213 | Acceleration information data |
| 215 | Memory Map data |
| 217 | Other data |
| 219 | Detection Module |
| 221 | Acceleration information determining Module |
| 223 | Memory Map generation module |
| 225 | Other modules |
| 400 | Example general system |
| 410 | Main processor |
| 411 | CPU core |
| 412 | Controller |
| 413 | Accelerator |
| 420a, 420b | memories |
| 430a, 430b | Storage devices |

-continued

Referral Numerals:

| Reference Number | Description |
| --- | --- |
| 431a, 431b | Controller of storage device |
| 432a, 432b | Flash memory of storage device |
| 441 | Optical input device |
| 442 | User input device |
| 443 | Sensor |
| 444 | Communication device |
| 445 | Display |
| 446 | Speaker |
| 447 | Power supplying device |

We claim:

1. A method of generating memory maps, the method comprising:
   detecting, by a computing system, at least one of a Dual In-Line Memory Modules (DIMM) and one or more Dynamic Random Access Memory (DRAM) chips associated with the computing system, wherein one or more accelerators are configured in at least one of the DIMM and the one or more DRAM chips;
   determining, by the computing system, accelerator information for each of the one or more accelerators based on flags stored in reserved bytes of at least one of Serial Presence Detect (SPD) and Multi-Purpose Register (MPR) associated with at least one of the DIMM and one or more DRAM chips, the accelerator information providing information regarding the one or more accelerators present in the at least one of the DIMM and the one or more DRAM chip;
   generating, by the computing system, a unique memory map for each of the one or more accelerators based on the accelerator information of the corresponding one or more accelerators.

2. The method of claim 1, further comprising:
   assigning, by the computing system, one or more tasks to the one or more accelerators based on the accelerator information of the corresponding one or more accelerators.

3. The method of claim 1, wherein the accelerator information
   comprises indications of
   presence or absence of the one or more accelerators in at least one of the DIMMs and the one or more DRAM chips,
   capabilities of the corresponding one or more accelerators, and
   position of the one or more accelerators in at least one of the DIMM and the one or more DRAM chips.

4. The method of claim 1, further comprises:
   grouping, by the computing system, the one or more accelerators into one or more groups based on a position of the one or more accelerators in at least one of the DIMMs and the one or more DRAM chips; and
   generating, by the computing system, a memory map for each of the one or more groups of the one or more accelerators.

5. The method of claim 1, wherein position of the one or more accelerators is classified into one or more hierarchy levels, the hierarchy levels comprising rank level, DRAM chip level, bank level, bank groups level, and rows and columns level.

6. The method of claim 1 further comprises:
   configuring, by the computing system, memory controller registers based on memory maps generated for each of the corresponding one or more accelerators.

7. A computing system for generating memory maps, the computing system comprising:
   a processor; and
   a memory communicatively coupled to the processor, wherein the memory stores processor-executable instructions, which, on execution, causes the processor to
   detect at least one of a Dual In-Line Memory Modules (DIMM) and one or more Dynamic Random Access Memory (DRAM) chips associated with the computing system, wherein one or more accelerators are configured in at least one of the DIMM and the one or more DRAM chips,
   determine accelerator information for each of the one or more accelerators based on flags stored in reserved bytes of at least one of Serial Presence Detect (SPD) and Multi-Purpose Register (MPR) associated with at least one of the DIMM and one or more DRAM chips, the accelerator information providing information regarding the one or more accelerators present in the at least one of the DIMM and the one or more DRAM chip, and
   generate a unique memory map for each of the one or more accelerators based on the accelerator information of the corresponding one or more accelerators.

8. The computing system of claim 7, wherein the processor-executable instructions on execution causes the processor to assign one or more tasks to the one or more accelerators based on the accelerator information of the corresponding one or more accelerators.

9. The computing system of claim 7, wherein the accelerator information comprises indications of
   presence or absence of the one or more accelerators in at least one of the DIMM and the one or more DRAM chips,
   capabilities of the corresponding one or more accelerators, and
   position of the one or more accelerators in at least one of the DIMM and the one or more DRAM chips.

10. The computing system of claim 7, wherein the processor-executable instructions on execution causes the processor to
    group the one or more accelerators into one or more groups based on a position of the one or more accelerators in at least one of the DIMM and the one or more DRAM chips, and
    generate a memory map for each of the one or more groups of the one or more accelerators.

11. The computing system of claim 7, wherein position of the one or more accelerators is classified into one or more hierarchy levels, the hierarchy levels comprising rank level, DRAM chip level, bank level, bank groups level, and rows and columns level.

12. The computing system of claim 7, wherein the processor-executable instructions on execution causes the processor to configure memory controller registers based on memory maps generated for each of the corresponding one or more accelerators.

* * * * *